United States Patent

Yasumatsu

[11] 4,238,129
[45] Dec. 9, 1980

[54] PASSIVE SEATBELT SYSTEM
[75] Inventor: Jun Yasumatsu, Toyota, Japan
[73] Assignee: Toyota Jidosha Kogyo Kabushiki Kaisha, Toyota, Japan
[21] Appl. No.: 37,159
[22] Filed: May 8, 1979
[30] Foreign Application Priority Data Aug. 16, 1978 [JP] Japan .................... 53-112187[U]

[51] Int. Cl.³ .............................................. B60R 21/10
[52] U.S. Cl. ..................................... 280/802; 297/469
[58] Field of Search ............... 280/804, 803, 802, 808, 280/801; 297/469, 483, 468

[56] References Cited
U.S. PATENT DOCUMENTS

| | | | |
|---|---|---|---|
| 3,794,135 | 2/1974 | Ewert | 280/802 |
| 3,941,419 | 3/1976 | Blom | 280/808 |
| 4,004,829 | 1/1977 | Kato et al. | 280/802 |
| 4,053,175 | 10/1977 | Kato | 280/803 |
| 4,130,252 | 12/1978 | Mori | 280/808 |

Primary Examiner—John A. Pekar
Attorney, Agent, or Firm—Koda and Androlia

[57] ABSTRACT

A passive seatbelt system wherein the outer end of the passenger restraining belt moves forward or backward, permitting passenger entrance or exit and to automatically fasten or unfasten the belt about the passenger. The passive seatbelt system further includes at least one elastic piece coupled to the outer end of the belt whose rigidity gradually decreases from the outer end of the belt towards the center of the belt whereby when the belt is fastened the belt separates sufficiently from the passenger while still being able to be fastened normally when the belt is automatically fastened.

11 Claims, 16 Drawing Figures

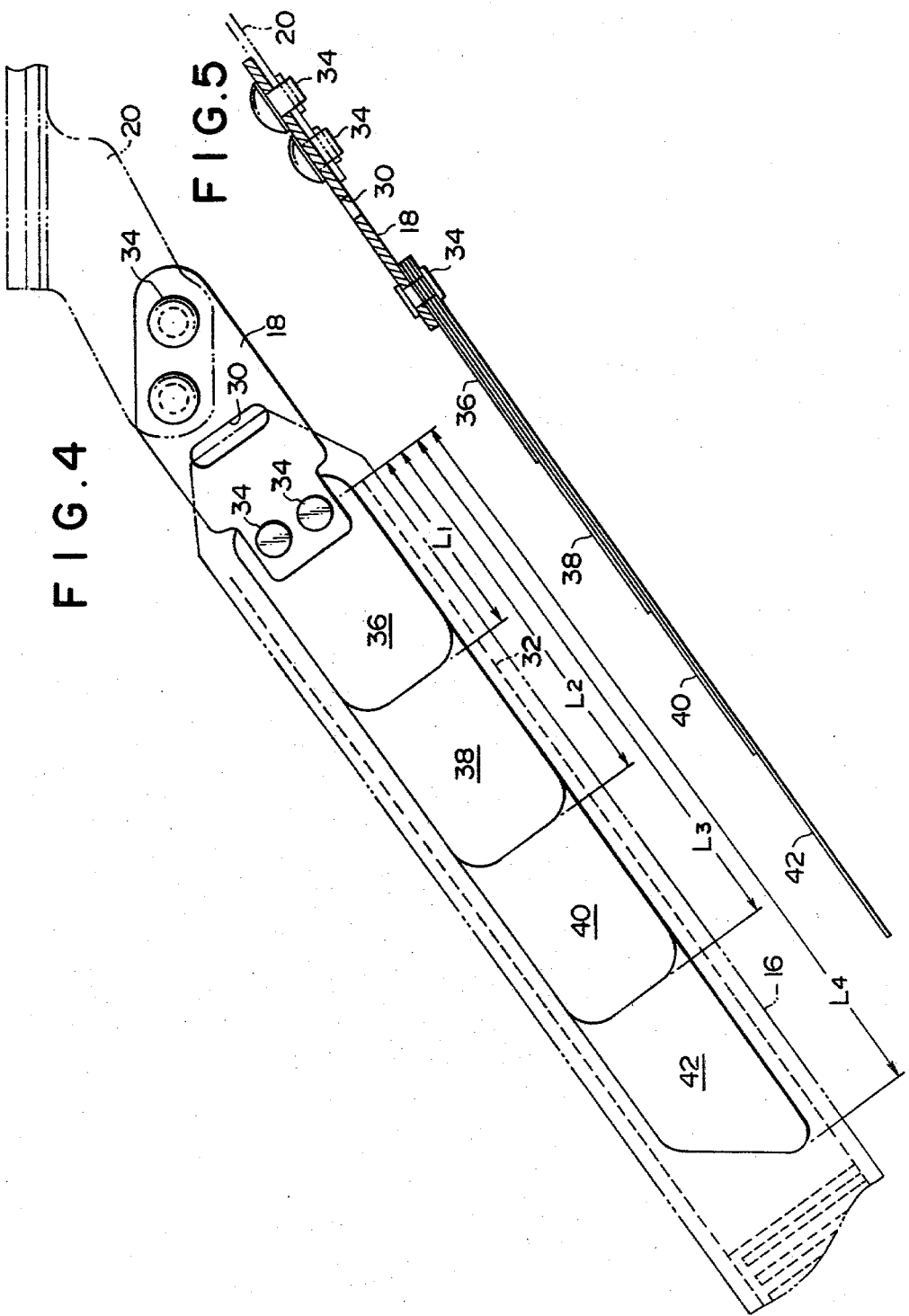

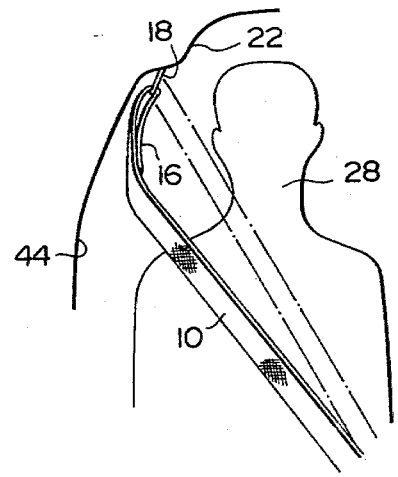
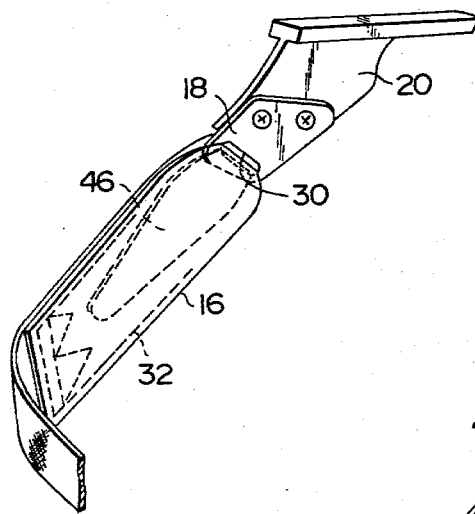
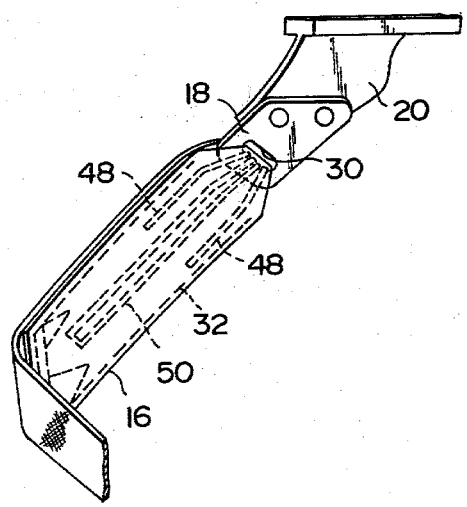

PASSIVE SEATBELT SYSTEM

BACKGROUND OF THE INVENTION

1. Field of the Invention

This invention relates to seatbelt systems and more particularly to passive seatbelt systems which automatically fasten a passenger restraining belt around the passenger after he has seated himself.

2. Prior Art

Since seatbelt systems protect the passenger by restraining him in times of vehicular emergency, the passenger's safety is greatly increased. Since there are difficulties such as donning, feeling of oppression while wearing the belt, etc., the proportion of the belt wearers is very low. For this reason, a passive seatbelt system which can automatically fasten the belt about the passenger after he has seated himself is presently proposed.

An example of such a passenger seatbelt system is constructed such that the outer end of the passenger restrictive belt runs in a guide rail fastened to the roof side of the vehicle such that it can be moved forward or backward along the vehicle and the passenger restraining belt is caused to approach or move away from the passenger seat to thereby automatically fasten or unfasten the belt from the passenger.

However, although these passive seatbelt systems cause the outer end of the seatbelt to move towards the front of the vehicle when the passenger enters or exits, the passenger sometimes comes into contact with the belt near the outer end of the belt which is immediately in front of the passenger during entering or exiting and this contact makes the passenger feel uneasy. Furthermore, as the outer end moves toward the front or rear of the vehicle during automatic unfastening or fastening, the belt may come into contact with the passenger's body, especially his face, causing an uncomfortable sensation. Furthermore, as a result of the belt coming into contact with the passenger's neck, face, etc. during driving, in times of vehicular emergency the belt may constrict about the passenger's neck thereby causing an unfortunate circumstance.

SUMMARY OF THE INVENTION

Accordingly, it is a general object of the present invention to provide a seatbelt system which not only does not give the passenger an uncomfortable feeling during entering or exiting but also does not come into contact with the passenger during automatic fastening or unfastening.

It is still another object of the present invention to provide a passive seatbelt system which can securely and appropriately fasten the belt.

In keeping with the principles of the present invention, the objects are accomplished by a unique seatbelt system wherein the other end of the passenger restraining belt moves forward or backward to automatically fasten or unfasten the belt about the passenger so that the passenger can enter or exit. The belt is provided with flexible pieces so that the rigidity of the belt decreases from the outer end towards the center whereby when the belt is unfastened, it separates sufficiently from the passenger while being able to assume a normal fastend condition when the belt is fastened.

BRIEF DESCRIPTION OF THE DRAWINGS

The above-mentioned features and objects of the present invention will become more apparent with reference to the following description taken in conjunction with the accompanying drawings wherein like reference numerals denote like elements and in which:

FIG. 4 is an enlarged front view illustrating the flexible materials;

FIG. 5 is a side view of FIG. 4;

FIG. 6 is a side view of FIG. 1;

FIG. 7 is a partial enlarged close-up view illustrating a second embodiment of the present invention;

FIG. 8 is a partial enlarged close-up view illustrating a third embodiment of the present invention;

DETAILED DESCRIPTION OF THE INVENTION

Figure 1:
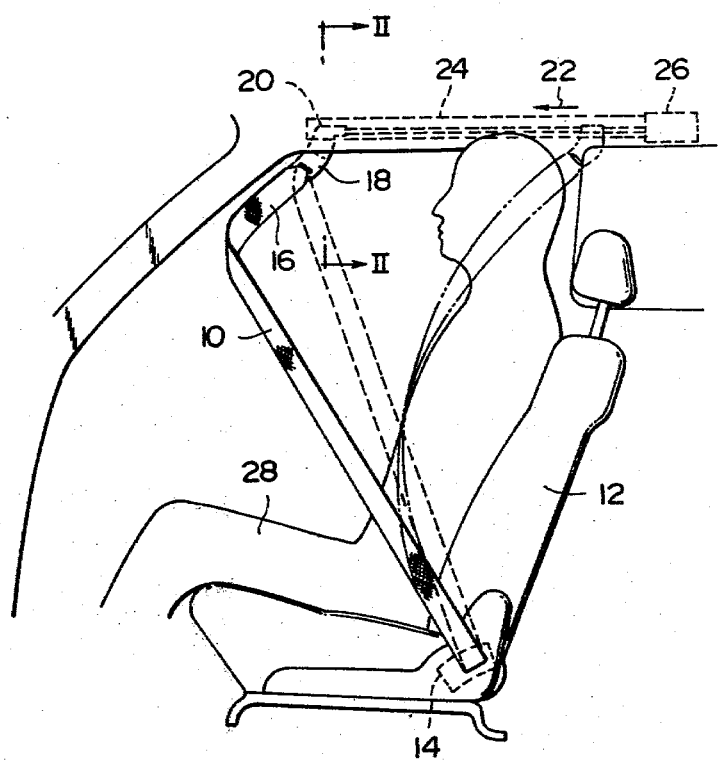
FIG. 1 is a side view illustrating a first embodiment of a passive seatbelt system in accordance with the teachings of the present invention.

Referring more particularly to the figures, shown in FIG. 1 is a first embodiment of a passive seatbelt system in accordance with the teachings of the present invention. In FIG. 1, one end of the passenger restraining belt 10 is wound up by the force of a retractor 14 which is contained on the inner side of the passenger seat 12. The outer end 16 of the belt 10 is fastened to a slider by a shoulder anchor 18. Winder 14 contains an inertial locking mechanism which instantly stops the unwinding of the belt 10 during a vehicular emergency.

Slider 20 is fastened so that it can move forward or backward along the vehicle in guide rail 24 which is fastened to roof side member 22 of the vehicle. The slider 20 is moved forward or backward along the vehicle by operating system 26. The operating system 26, operating in response to a signal given by door opening or closing when the passenger enters, moves slider 20 in the direction of operation system 26 after the passenger has seated himself in the passenger seat 12, i.e. shoulder anchor 18 is moved towards the rear of the vehicle and belt 20 is automatically fastened about the passenger 28 who is seated in the passenger seat 12. Alternately, when the passenger exits, slider 20 is moved in a direction away from operating system 26, i.e. shoulder anchor 18 is moved towards the front of the vehicle forming a space for the passenger to exit between the belt 10 and the passenger seat 12. Between the operating system 26 and the slider 20 there is a wire, etc. for the purpose of transmitting the motive power of a motive system such as a motor, etc., mounted in the operating system 26.

Figure 2:
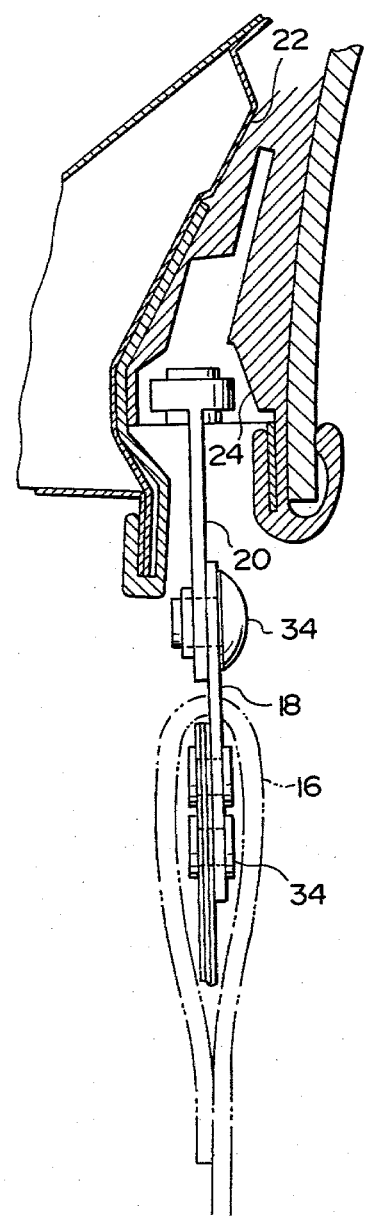
FIG. 2 is a cross sectional view along the line II—II of FIG. 1.
Figure 3:
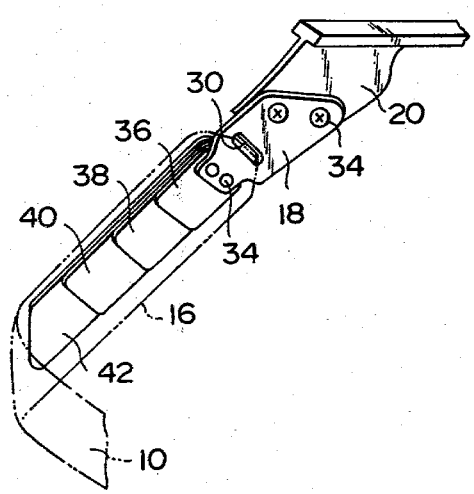
FIG. 3 is a close-up view illustrating the fastening of the elastic material to the slider.

As shown in FIGS. 2 and 3, the outer end 16 of the passenger restraining belt 10 is fastened by being inserted through passenger slot 30 in the shoulder anchor 18, folded back and sewn with seams 32. The base part of the shoulder anchor 18 is fastened to slider 20 by two fastening bolts 34. Elastic pieces 36, 38, 40 and 42 are fastened to the end of shoulder anchor 18 by two fastening bolts 34. These elastic pieces 36 through 42 are made from spring sheet having identical thickness and width. The length of the elastic pieces 36 through 42 are identified as L1, L2, L3 and L4. L2, L3, and L4 are respectively twice, three times and four times as long as L1. Furthermore, if these elastic pieces 36 through 42 are thought of as a half leaf spring, the rigidity is set so as to decrease gradually toward the outer end so that if a binding force is applied to the outer end of the elastic piece 42, the amount of bending near the shoulder anchor 18 is extremely small and gradually increases as you move away from the shoulder anchor 18. The elastic pieces 36 through 42 extend slider 20 and are slightly inclined towards the front of the vehicle from the vertical. Furthermore the elastic pieces 36 through 42 are covered by the outer end 16 of the belt 10 which has been folded back through the slot 30 of the shoulder anchor 18 and are sealed inside outer end 16 by seams 32.

By the above-described means, the passenger does not come directly into contact with the elastic pieces. Furthermore, if the passenger should come in contact with the outer end 16 which contains the elastic pieces 36 through 42, the elastic pieces 36 through 42 will not cause injury of the passenger since they can bend.

Furthermore, as shown in FIGS. 2, 6, it is desirable that the elastic pieces 36 through 42 basically hang below the slider 20 such that the outer end 16 can run along the side 44 of the vehicle and provide an appropriate space in between it and the head of the passenger 28. In operation, as the outer end 16 of the belt 10 and slider 20 move to the front of the vehicle before the passenger enters, a passenger entrance space is formed between the belt 10 and the seat 12 and the passenger 20 may easily seat himself in the seat 12. After the passenger has seated himself, an operating system 26 moves the slider 20 towards the rear of the vehicle and the belt 10 approaches the passenger 28 seated in the seat 12. As a result, passenger 28 is automatically placed in a fastened-in condition by the belt 10. However, as shown in FIG. 6, since the outer end 16 of the belt 10 is shaped so as to run along the vehicle side 44 by the rigidity of the elastic pieces 36 through 44, the belt 10 does not come in contact with the head of the passenger 28 during this motion and the passenger may be comfortably brought to an automatically fastened-in condition by the belt 10. Fruthermore, since the belt 10 cannot constrict the neck of the passenger 28 after fastening, the passenger may be brought to a secure, appropriate, fastened-in condition. In addition, during a vehicular emergency, the unwinding of belt 10 is stopped by the operation of an inertial mechanism of a retractor 14 and the passenger's chest is restrained diagonally by the belt 10 and the passenger's safety is guaranteed.

Next, when the passenger exits the vehicle and opens the door, the operating system 26 moves the slider 20 to the front of the vehicle and belt 10 is separated from the passenger seat 12 to form a passenger exit space. In somewhat the same way as the automatically fastened condition, since the outer end 16 is kept approximately vertical by the rigidity of the elastic pieces 36 through 42 as it moves towards the front of the vehicle, it does not come in contact with the passenger 28. Also, as shown in FIG. 1, as the passenger enters, outer end 16 is bent towards the front of the vehicle by the rigidity of the pieces 36 through 42 and, as shown in FIG. 6, a suitable distance is maintained relative to the passenger's head and the passenger does not come in contact with outer end 16 and a comfortable exit is possible.

Referring now to FIG. 7, shown therein is the second embodiment of the present invention. In the second embodiment a plastic plate 46 is used instead of the elastic pieces 36 through 42. The plastic plate 46 has one end fastened through slot 30 of the shoulder anchor 13 while the other end protrudes in the direction of the center of the belt 10 in somewhat the same manner as the elastic pieces 36 through 42 of the prior embodiment and the width of the plastic plate decreases in this direction. Therefore, the rigidity of the plastic plate 46 decreases in somewhat the same manner as in the previous embodiment. Furthermore, in this second embodiment, the rigidity of the outer end 16 is greater near the shoulder anchor 18 and decreases towards the end of the plastic plate 46.

Referring to FIG. 8, shown therein is the third embodiment of the present invention. In this third embodiment, rod-like elastic elements 48 and 50 such as piano wire, etc. are sealed in the outer end of the belt 10 in somewhat the same manner in the first and second embodiments. Here, the length of the elastic piece 48 along the direction of the belt 10 is approximately half the length of the elastic piece 50. Furthermore, in this embodiment just as in the previous embodiments, the rigidity of the outer end 16 gradually decreases and results substantially like those of the previous embodiments are produced. In addition, in this third embodiment the rigidity of the belt 10 near its outer end may be gradually varied by using the elastic pieces of two different cross sections or by using the elastic pieces of different lengths.

Figure 9:
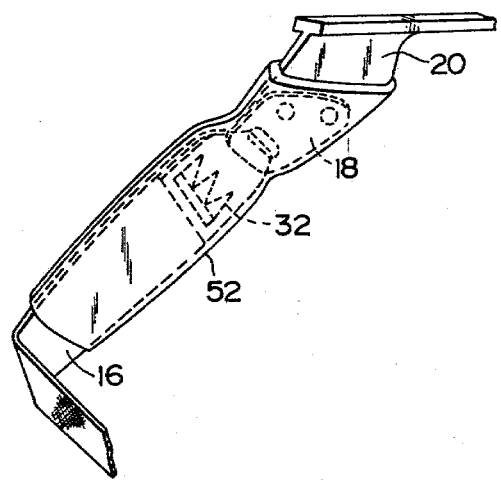
FIG. 9 is a partial enlarged close-up view illustrating a fourth embodiment of the present invention.
Figure 10:
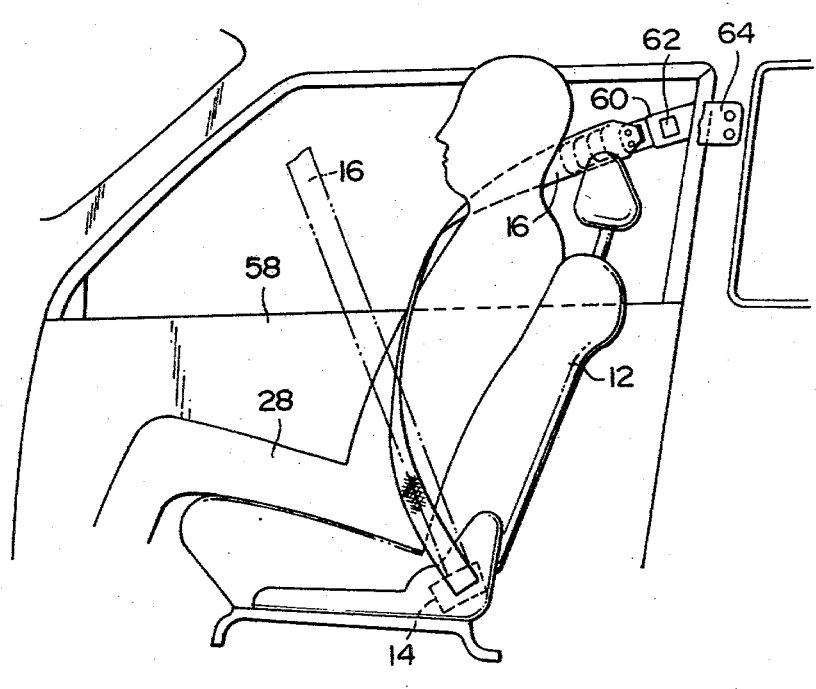
FIG. 10 is a side view illustrating a fifth embodiment of the present invention.
Figure 11:
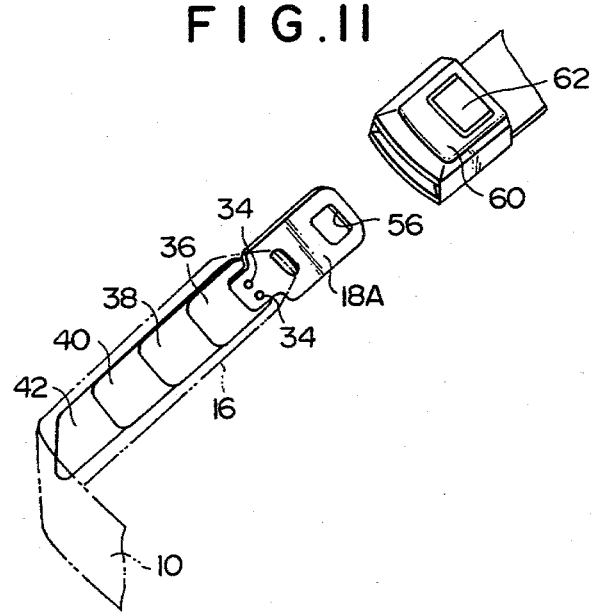
FIG. 11 is a close-up view illustrating the fastening of the elastic material to the slider.
Figure 12:
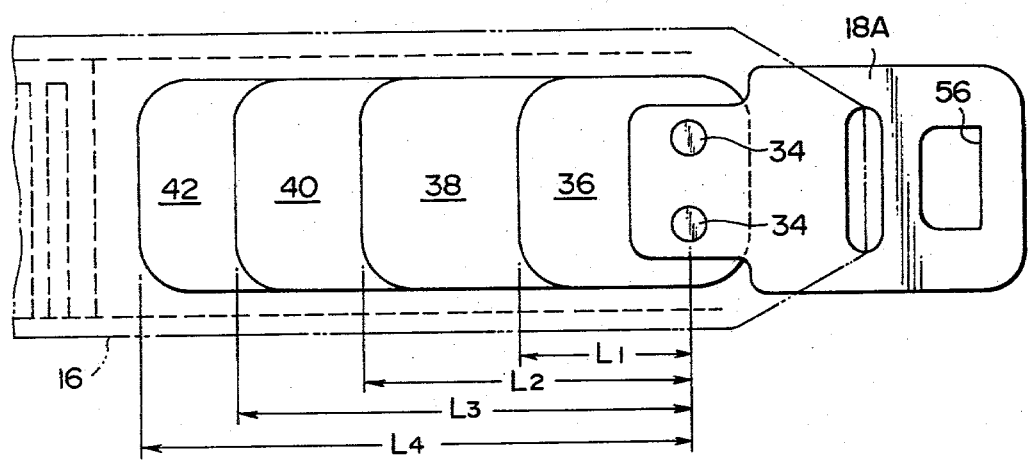
FIG. 12 is an enlarged front view illustrating the elastic material.
Figure 13:
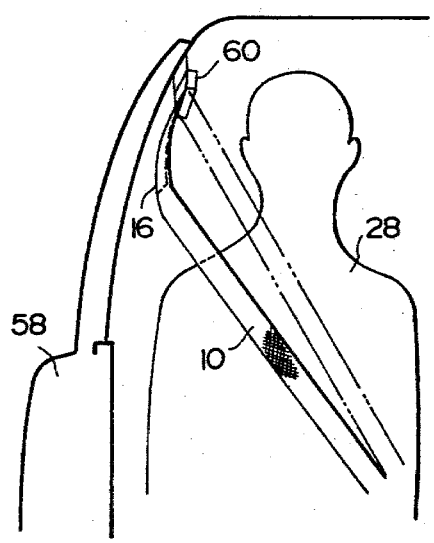
FIG. 13 is a side view of FIG. 10.

Referring to FIG. 9, shown therein is the fourth embodiment of the present invention. In this fourth embodiment a plastic cover 52 is used as the elastic material. Cross section of the plastic cover 52 is arranged and configured such that it wraps around the belt 10 with one end extending to the slider 20 and the other end towards the central part of the belt 10. Therefore, in somewhat the same manner as in the previous embodiment, this gives the rigidity to the outer end 16. Since the cross section area of the plastic cover 52 gradually decreases from the shoulder anchor 18 towards the central part of the belt 10, the rigidity decreases just as the prior embodiments. Furthermore, in this fourth embodiment, since the rigidity of the outer end 16 gradually decreases, similar results to those of the prior embodiment are obtained.

From the above description it should be apparent that while the construction is described in terms of being used in a passive seatbelt system which utilizes a retractor, it would be possible to utilize the present invention with passive seatbelts of other designs which may or may not use a retractor.

Referring to FIGS. 10 through 13, shown therein is a fifth embodiment of the present invention. In this fifth embodiment, an engagement hole 56 is formed in a shoulder anchor 18A and this engagement hole 56 engages with a buckle device 60 which is fastened to the top rear corner of the passenger door 58. That is to say, the outer end 16 of belt 10 creates a fastened condition about the passenger when the door 58 is closed and separates from the seat 12 by moving towards the front of the vehicle along with the door 58 when the door 58 is opened so that the belt 10 may be unfastened from about the passenger.

The buckle device 60 is a buckle substantially the same as used in normal seatbelt systems and a locking plate (not shown) engages the opening 56 of the shoulder anchor 18A. If the passenger presses the release button 62 while belt 10 is fastened, shoulder anchor 18A is released from the buckle device 60, the belt 10 is released from the fastened condition and the door 58 may be opened to allow escape to the outside of the vehicle. Furthermore, a reinforcing plate 64 is provided and in times of vehicular emergency since a large extensive force is transmitted to the buckle device 60 by the belt 10, the reinforcing plate 64 transmits this force to the body of the vehicle to thereby stop damage to the buckle device 60.

In this fifth embodiment, since the anchor 18A is fitted with elastic pieces 36 through 42 of different lengths as in the first embodiment, the rigidity of the outer end 16 gradually decreases as in the first embodiment and outer end 16 is separated from the passenger 28 when in the unfastened condition while still providing appropriate placement during the fastened condition.

Figure 14:
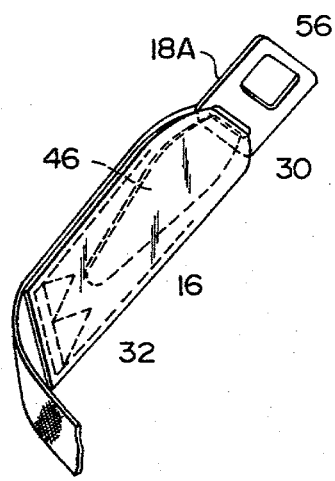
FIG. 14 is a partial enlarged close-up view illustrating a sixth embodiment of the present invention.
Figure 15:
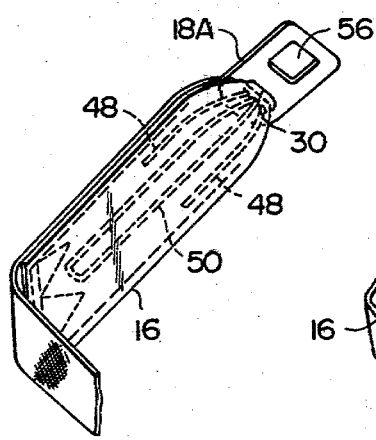
FIG. 15 is a partial enlarged close-up view illustrating a seventh embodiment of the present invention.
Figure 16:
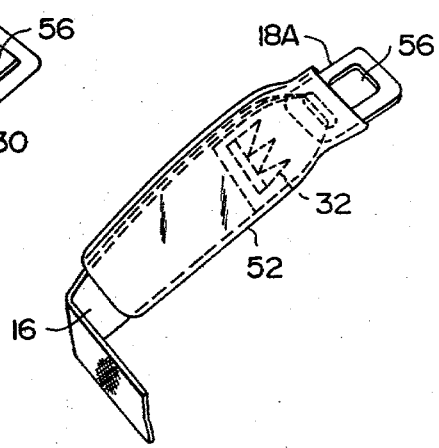
FIG. 16 is a partial enlarged close-up view illustrating an eighth embodiment of the present invention.

Referring to FIGS. 14 through 16, shown therein are six, seventh and eighth embodiments of the present invention. In these embodiments respectively are shown a plastic plate 46, elastic pieces 48 and 50 and a plastic cover 52 similar to the second, third and fourth embodiments, respectively. Each of these six, seventh and eighth embodiments have a construction wherein there are fastened to the shoulder anchor 18A and each is capable of producing the same results as in the prior embodiments.

In the passive seatbelt system of the present invention as described above, since the elastic pieces are fastened such that the rigidity decreases towards the center of the belt 10, an extremely confortable entering or exiting operation can be provided while still providing an appropriate normal belt fastening about the passenger.

It should be apparent to one skilled in the art that the above described embodiments are merely illustrative of but a few of many possible specific embodiments which represent the application of the principles of the present invention. Numerous and varied other arrangements can be readily devised by those skilled in the art without departing from the spirit and scope of the invention.

I claim:
1. In a passive seatbelt system which automatically fastens or unfastens a belt about a passenger as a result of the outer end of the passenger restraining belt separating from the passenger to permit entering or exiting of the passenger, said passive seatbelt system being characterized by at least one elastic piece coupled to said belt, said elastic piece's rigidity gradually decreasing from the outer end of the belt towards the central portion of the belt, thereby causing the outer end of said belt to sufficiently separate from said passenger.

2. A passive seatbelt system according to claim 1, wherein said elastic piece is fastened to a shoulder anchor together with the belt, and the shoulder anchor is fastened to a slider which can move forward or backward along a roof side of the vehicle.

3. A passive seatbelt system according to claim 2, wherein a slot is formed in said shoulder anchor and said belt is folded back through said slot and encloses said elastic piece.

4. A passive seatbelt system according to claim 3, wherein said folded back belt encloses said elastic piece and is closed by seams.

5. A passive seatbelt system according to claim 4, wherein said elastic piece is constructed from several pieces of spring sheet of differing lengths.

6. A passive seatbelt system according to claim 5 wherein said elastic piece extends from said shoulder anchor inclined towards the front of and in a longitudinal vertical plane of said vehicle.

7. A passive seatbelt system according to claim 4, wherein said elastic piece decreases in width from the outer end towards said central portion of said seatbelt.

8. A passive seatbelt system according to claim 4, wherein said elastic piece comprises a plurality of rod-shaped elastic material of differing lengths.

9. A passive seatbelt system according to claim 2, wherein said elastic piece is a plastic cover enclosing the outer end of the belt.

10. A passive seatbelt system according to claim 2, wherein said elastic piece is fastened to the shoulder anchor together with the belt and said shoulder anchor is anchored to a door of said vehicle whereby the belt is caused to separate from the passenger by the opening and closing of the door.

11. A passive seatbelt system according to claim 10, wherein said belt is fastened to the door by the engagement of said shoulder anchor and a buckle device fasten to the door.

* * * * *